US006364343B1

(12) United States Patent
Slota et al.

(10) Patent No.: US 6,364,343 B1
(45) Date of Patent: Apr. 2, 2002

(54) GRAB HANDLE BRACKET/AIRBAG IGNITER RETAINER

(75) Inventors: Gary M Slota, Macomb Township; Gerald F Burke, Livonia; Thomas C Booth, Roseville; Dennis F Stedman, Ortonville, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/620,258

(22) Filed: Jul. 21, 2000

(51) Int. Cl.[7] .............................................. B60R 21/16
(52) U.S. Cl. .................................. 280/728.2; 280/730.2
(58) Field of Search ........................... 280/728.1, 728.2, 280/730.2

(56) References Cited

U.S. PATENT DOCUMENTS

| | | | |
|---|---|---|---|
| 5,425,549 A | | 6/1995 | Oda ......................... 280/728.2 |
| 5,503,426 A | | 4/1996 | Lang et al. ................ 280/728.2 |
| 5,542,691 A | * | 8/1996 | Marjanski et al. ........ 280/728.2 |
| 5,556,127 A | * | 9/1996 | Hurford et al. ........... 280/730.2 |
| 5,564,739 A | * | 10/1996 | Davidson ..................... 280/736 |
| 5,639,111 A | * | 6/1997 | Spencer et al. ........... 280/728.2 |
| 5,678,848 A | | 10/1997 | Soderquist ................ 280/728.2 |
| 5,681,055 A | | 10/1997 | Green et al. .............. 280/728.2 |
| 5,700,029 A | | 12/1997 | Enders ..................... 280/728.2 |
| 5,755,457 A | * | 5/1998 | Specht ..................... 280/728.2 |
| 5,785,346 A | * | 7/1998 | Benz et al. ............... 280/728.2 |
| D397,667 S | | 9/1998 | White ........................ D12/223 |
| 5,820,159 A | * | 10/1998 | Werner et al. ............ 280/728.2 |
| 5,924,831 A | | 7/1999 | Ricks et al. ................. 411/508 |
| 5,934,700 A | * | 8/1999 | Disam et al. ............. 280/728.2 |
| 5,944,341 A | * | 8/1999 | Kimura et al. ........... 280/728.3 |
| 5,947,509 A | | 9/1999 | Ricks et al. .............. 280/728.2 |
| 5,979,929 A | * | 11/1999 | Stanger et al. ........... 280/728.2 |
| 6,092,833 A | * | 7/2000 | Nariyasu ................. 280/728.2 |
| 6,102,434 A | * | 8/2000 | Ohlert et al. ............. 280/728.2 |
| 6,149,185 A | * | 11/2000 | White, Jr. et al. ....... 280/728.2 |

* cited by examiner

Primary Examiner—Eric Culbreth
Assistant Examiner—L. Lum
(74) Attorney, Agent, or Firm—Mark P. Calcaterra (57) ABSTRACT

A bracket is provided for assembling an airbag unit and interior vehicle components into a vehicle. The bracket efficiently utilizes the limited interior vehicle space to package all necessary components. To achieve this end, the bracket attaches to a frame member. Within the bracket is a cavity for securely holding an airbag igniter unit. The airbag igniter unit is attached, via a hose, to an airbag. The airbag is partially fit into a recess formed in the bracket. The bracket also maintains a mounting face, to which an interior grab handle can be secured. The bracket allows for the existence of an airbag subassembly which includes, the bracket, an airbag operatively attached to an airbag igniter unit, and an interior grab handle. Such a subassembly will improve overall vehicle assembly efficiency by reducing the amount of steps required in assembly, thus making the assembly process easier.

20 Claims, 6 Drawing Sheets

GRAB HANDLE BRACKET/AIRBAG IGNITER RETAINER

FIELD OF THE INVENTION

The present invention is related to side airbag impact systems, and more particularly to an improved method of mounting side airbag curtain systems.

BACKGROUND OF THE INVENTION

Since the advent of the automobile, vehicle designers and manufacturers alike have sought to improve passenger safety within the automobile. Throughout the years, various elements of the vehicle have been developed and improved in order to ensure passenger safety. These areas include bumper impact systems, frame structures, and passenger restraint systems, such as seat belts. Additionally, airbag systems have developed to reduce the risk of passenger injury in the event of an accident. The use of airbags had traditionally been to install systems in either the steering column or dashboard of vehicles to protect the front seat passengers from injury. More recently, however, airbags have been installed in the side portions of vehicles to protect passengers from side impact collisions. Some airbag systems have been installed in the sides of the seats themselves, or in the side frame rail members of the vehicle. Specifically, one side impact airbag system has been designed such that an airbag deploys from the upper rails above the side passenger windows of the vehicle. In doing so, the airbag deployment acts as a curtain protecting passengers from head contact with the side of the vehicle, i.e. the window, frame pillars.

The introduction of such airbag systems within vehicles has resulted in the need for improved management of available space within the vehicle interior and subframe assemblies. Specifically, the upper side frame rail members and the interior of the vehicle has a significantly small amount of space in order to package an airbag system. Airbag systems not only include the airbag unit itself, but also include the attachment mechanism of the airbag to the vehicle, the igniter unit for inflating the bag, the appropriate electrical connectors to initiate airbag development and a connection hose which leads from the igniter unit to the airbag. This compilation of components requires a significant amount of space. Additionally, other interior components such as grab handles, interior lights and air conditioning ducts require some of the limited space available in the side roof frame portion of the vehicle. Different airbag sizes and shapes, packaging methods, and ignition systems have been developed to overcome packaging restraints within the vehicle. However, these methods may produce certain disadvantages in the deployment of the airbag. For example, as a result of the way an airbag is folded in its uninflated state, the inflation rate and area which it covers during the inflation is affected. Additionally, an ignition system which is located a distance away from the airbag itself, results in an extended length of time for full airbag deployment.

There also exists major ergonomic issues in attaching a large, long airbag assembly into the interior of the vehicle, during assembly. The attachment is typically in the upper portion of the vehicle interior towards the roof which is difficult to access during moving assembly.

It is, therefore, desirable to develop a new structure which can more efficiently use the space available in the upper frame rail portion of the vehicle for mounting an airbag system. Additionally, such a structure should be able to overcome the abovementioned disadvantages as well as allow for the implementation of other vehicle interior features such as lights and grab handles.

SUMMARY OF THE INVENTION

It is an object of the present invention to offer a structure which allows for the efficient packaging of an airbag unit within the upper frame rail members of a vehicle. It is also an object of the present invention to allow for additional interior features such as mounting a grab handle or interior light in the same space.

It is also another object of the present invention to offer simpler methods of assembly of the airbag unit within the vehicle frame structure.

The present invention is a bracket which allows for the packaging of the airbag igniter unit within, holding it fixedly, and allows for packaging of the airbag unit itself. Additionally, the bracket of the present invention maintains a surface to which an interior grab handle unit, or other interior feature, may be fixedly attached. The bracket itself is fixedly attached to the upper vehicle frame rail member on a first face. The bracket of the present invention is shaped as such to allow for minimal packaging demands for the airbag system. The airbag igniter unit is tucked within a cavity which runs the length of the bracket. The cavity is essentially round in shape, however, tapers slightly as it runs from a first end of the bracket to a second end of the bracket. This tapering allows for a press fit of the igniter unit within the bracket, securely fixing the igniter unit into the bracket. One end of the igniter unit maintains a wire harness outlet for attachment to a wire harness, which connects the airbag igniter to a crash sensor. In the event of an accident, the crash sensor signals the igniter unit to deploy the airbag. An opposite end of the cylindrically shaped igniter unit is connected directly to the airbag via a hose structure. The hose structure is clamped securely to the airbag igniter unit and runs from the igniter unit into a top portion of the airbag. The clamp runs around the outside surface of the hose, over the overlap region between the hose and igniter unit, and has an ear radially extending therefrom. The bracket of the present invention has a slit towards the end at which the hose is clamped to the airbag igniter unit. The airbag igniter unit is pressed into the bracket to such a degree that the radially extending clamp ear slides into the aforementioned slit. Towards the end of the slit is a recess, generally of a width greater than the width of the clamp ear. The eared portion of the clamp is then pushed in a first direction into the recess, preventing the igniter unit from being pulled out of the bracket, thus securing the airbag igniter unit fixedly. More plainly stated, the clamp ear and the slit with the recessed portion form a locking mechanism such that the airbag igniter unit cannot be pulled free from the bracket.

It is a further object of the present invention to provide a mounting structure for interior vehicle components, including a grab handle and an interior light. To achieve this, the bracket maintains a second face for fixedly attaching a grab handle unit thereto. The second face maintains a hole therethrough, as well as two recessed portions. An alignment finger of the grab handle unit may be inserted into the hole to facilitate proper alignment of the grab handle unit to the bracket. Additionally, the grab handle can be part of a larger sub-assembly (i.e. roof head liner). As such, the alignment hole can be used to locate the entire sub-assembly into the correct installation position. The recessed portions of the bracket receive protruding portions of the grab handle unit and the grab handle unit is then rigidly attached thereto.

It is also another object of the present invention to offer a simpler means of assembling an airbag system into the vehicle. Specifically, the bracket of the present invention can allow integration of all essential airbag components including the airbag igniter unit, the clamped hose, as well as the airbag itself, creating an airbag unit subassembly. The first face of the bracket, the contact face with the frame rail, maintains small mushroom-shaped members protruding a length from the surface. These mushroom-shaped members can be used to temporarily attach the airbag unit to the frame rail during production. The frame rail has slots pre-formed into its surface wherein each slot receives one of the mushroom-shaped members. In doing so, an operator may install the airbag unit using the mushroom-shaped members of the bracket into its proper position upon the frame rail slots, then retrieve the necessary tools and fastening mechanisms to permanently attach the airbag assembly to the frame rail. The bracket is fixedly attached via screw or bolt means through a pair of holes diagonally disposed on opposite ends of the bracket. By assembling the airbag unit into the vehicle in this manner, several steps of the assembly process are eliminated. Additionally, other steps are more ergonomic, thus making assembly easier for the operator.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 4b is a cross-sectional view taken along line 4b—4b of FIG. 4a;

DETAILED DESCRIPTION OF THE PREFERRED EMBODIMENTS

The following description of the preferred embodiment(s) is merely exemplary in nature and is in no way intended to limit the invention, its application, or uses.

Figure 1:
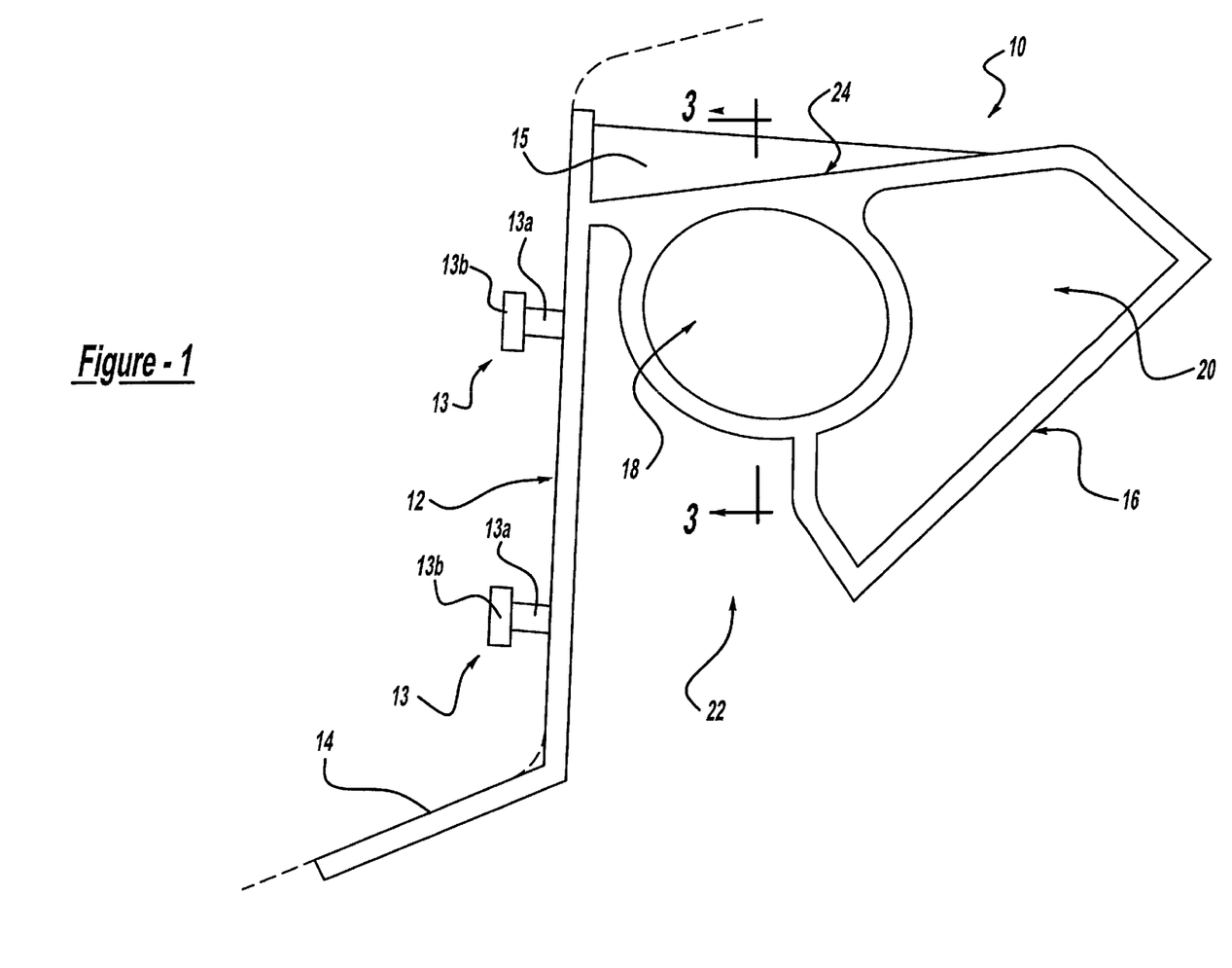
FIG. 1 is a side view of the bracket according to the principles of the present invention.
Figure 2:
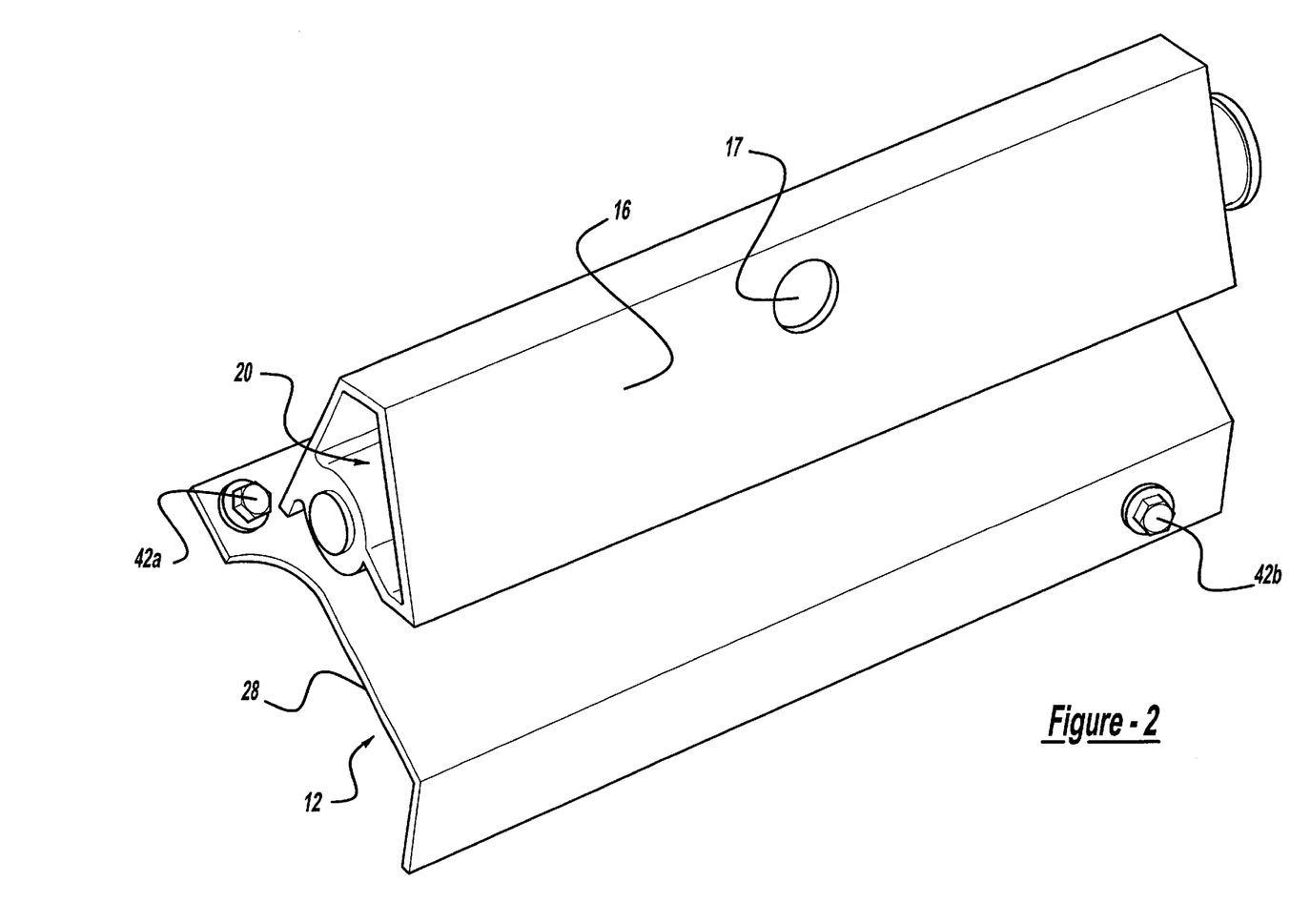
FIG. 2 is a perspective view of the bracket with an airbag igniter unit according to the principles of the present invention.

With particular reference to FIG. 1, the bracket 10 will now be described. The bracket 10 of the present invention is formed from an injection molding process and has a first face 12 which contacts a frame member (not shown), a second face 16 for mounting an interior grab handle (not shown), and a central cavity 18 for receiving an airbag igniter unit 28. A plurality of reinforcement ribs 15 are formed on the upper surface for providing increased strength and rigidity to the bracket 10. An additional cavity 20 is formed into the bracket to improve weight savings. The bracket 10 has recess 22 in a bottom portion for locating a wrapped airbag unit (not shown) therein. Extending from the first face 12 are temporary connection fingers 13 comprising a protruding body 13a with a head 13b. Connecting fingers 13 can be in the shape of either a mushroom, being round, or rectangular, among various other possibilities known in the art. The central airbag igniter unit cavity 18 is generally cylindrical in shape and runs the length of bracket 10. FIG. 2 is an isometric view of the bracket 10, as described above.

Figure 3:
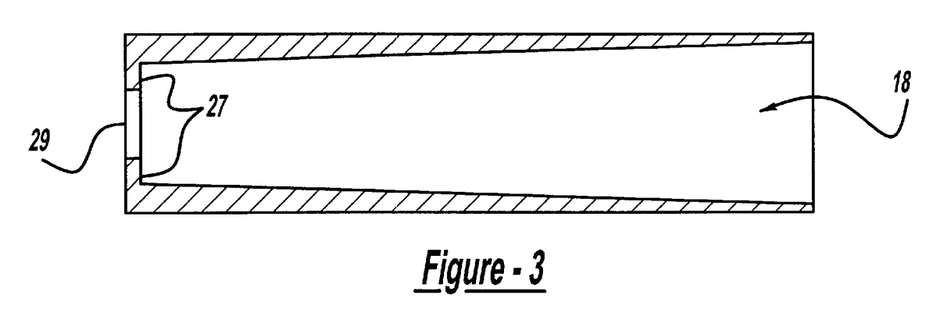
FIG. 3 is a cross-sectional view along line 3—3 or FIG. 1 according to the principles of the present invention.

FIG. 3 is a cross-sectional view along line 3—3 of FIG. 1, illustrating a cross-section of the central cavity 18. The central cavity 18 functions to retain an airbag igniter unit 28 best shown in FIGS. 2 and 7. The central cavity 18 is generally cylindrical in shape, however, it tapers from an initial diameter at one end to a slightly smaller diameter at an opposing end. As such, a cylindrically shaped airbag igniter unit 28 may then be press fit into the central cavity 18. Towards the far end of the central cavity 18, a back wall 27 is integrally formed having a hole 29 therethrough. The back wall 27 retains the airbag igniter unit and the hole 29 allows for electrical connection between the airbag igniter unit 28 and a sensor (not shown) located elsewhere in the vehicle.

Figure 4A:
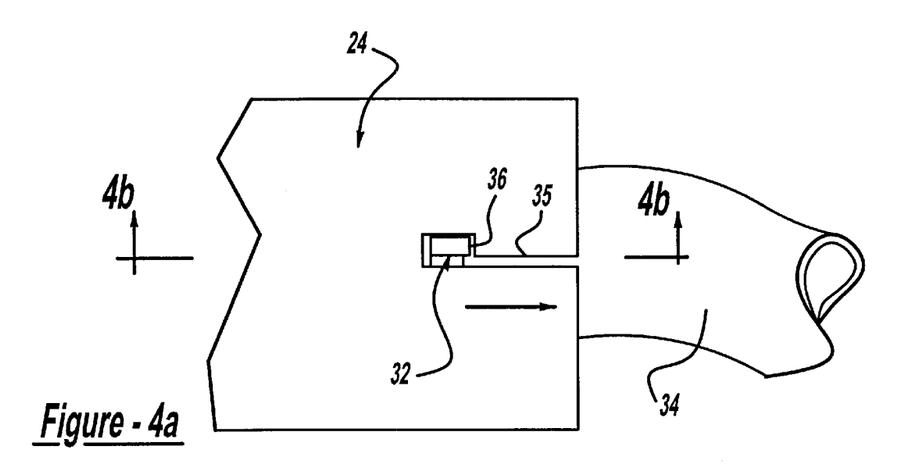
FIG. 4a is a detailed view of the bracket and clamp interface according to the present invention.
Figure 4B:
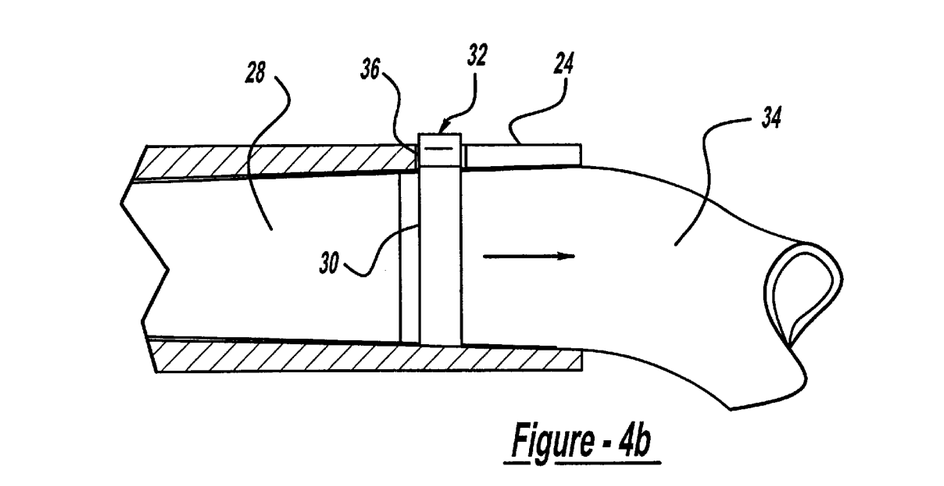

A slit 35 is formed through a top surface 24 of bracket 10, running a short distance along the length of the central cavity 18 at the end of which is formed a recessed area 36. These features are best shown in FIGS. 4a and 4b. In order for the airbag system to be complete, the airbag igniter unit 28 must be connected to an airbag 37. This is achieved via hose 34. Hose 34, fixedly attached to the airbag 37 unit runs from the airbag 37 to the airbag igniter unit 28. The hose 34 is pushed over the discharging end of the airbag igniter unit 28 and clamped thereto. The clamping means is generally of a stainless steel type clamp 30 which wraps around the outside diameter of the hose 34, over the interface area between the hose 34 and the airbag igniter unit 28, and has a radially extending ear 32. Ear 32 is formed through the securing process of the clamp 30 as is known in the art. As the airbag igniter unit 28 is press fit into the central cavity 18 of the bracket 10, the ear 32 of the clamp 30 slides through the slit 35 located on the top face 24 of the bracket 10. After the airbag igniter unit 28 has been press fit completely into the central cavity 18, the ear 32 is now located at the far end of the slit 35 in the recessed region 36. The ear 32 can now be rotated into the recessed area 36 such that it effectively locks the airbag igniter unit 28 and hose 34 assembly into bracket 10, prohibiting the airbag igniter unit 28 from being pulled out of the central cavity 18.

Figure 5A:
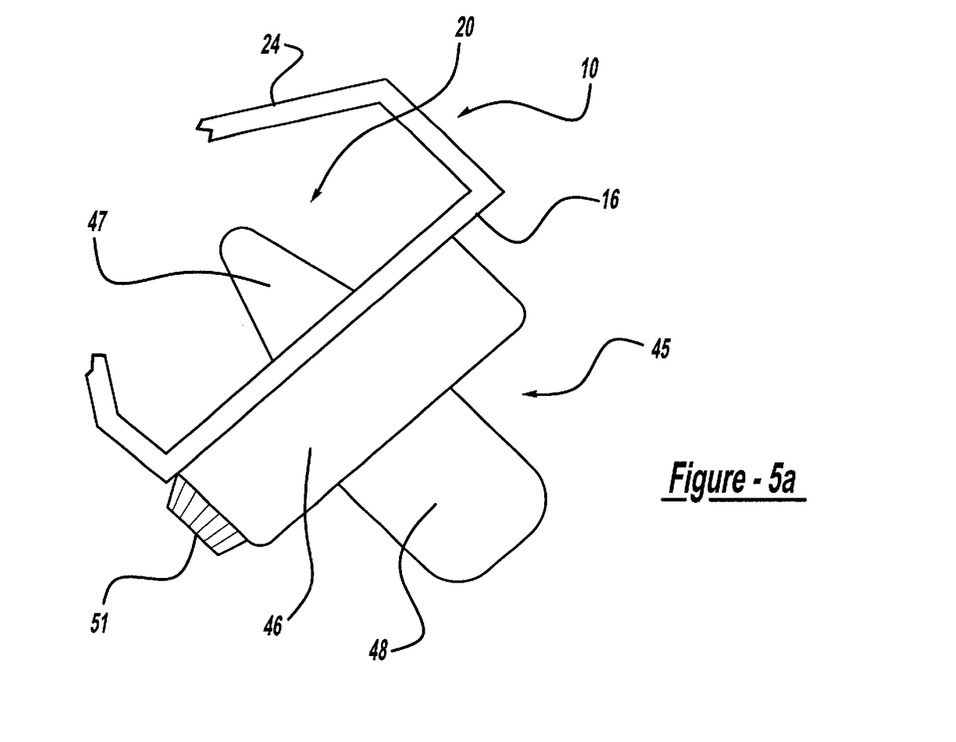
FIG. 5a is a side view detailing the attachment of a grab handle according to the present invention.
Figure 5B:
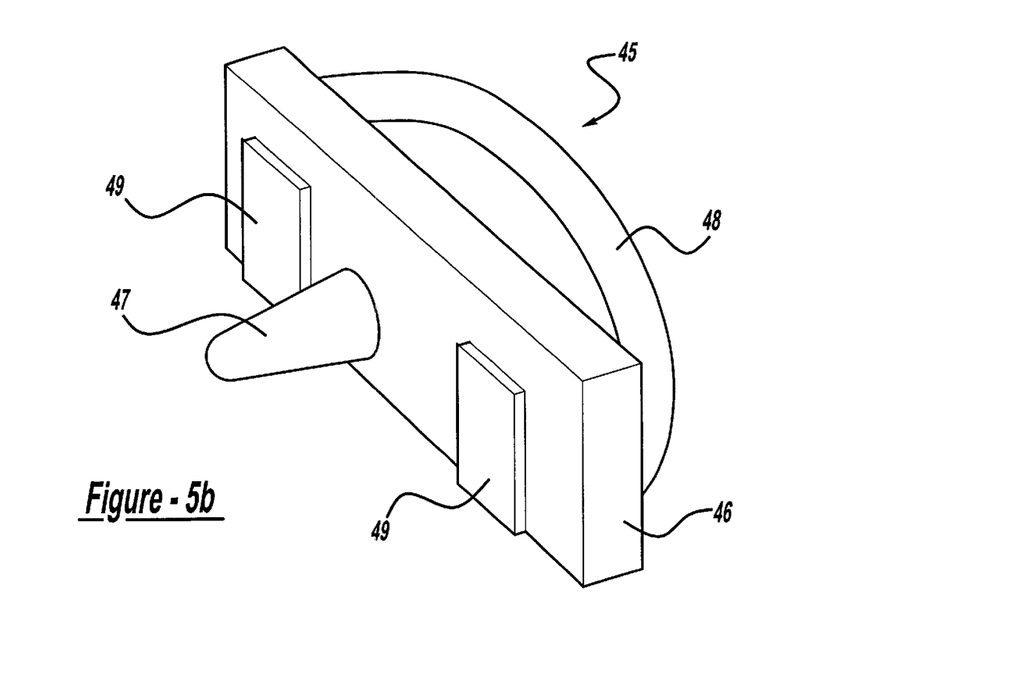
FIG. 5b is a perspective view of an interior grab handle according to the present invention.
Figure 5C:
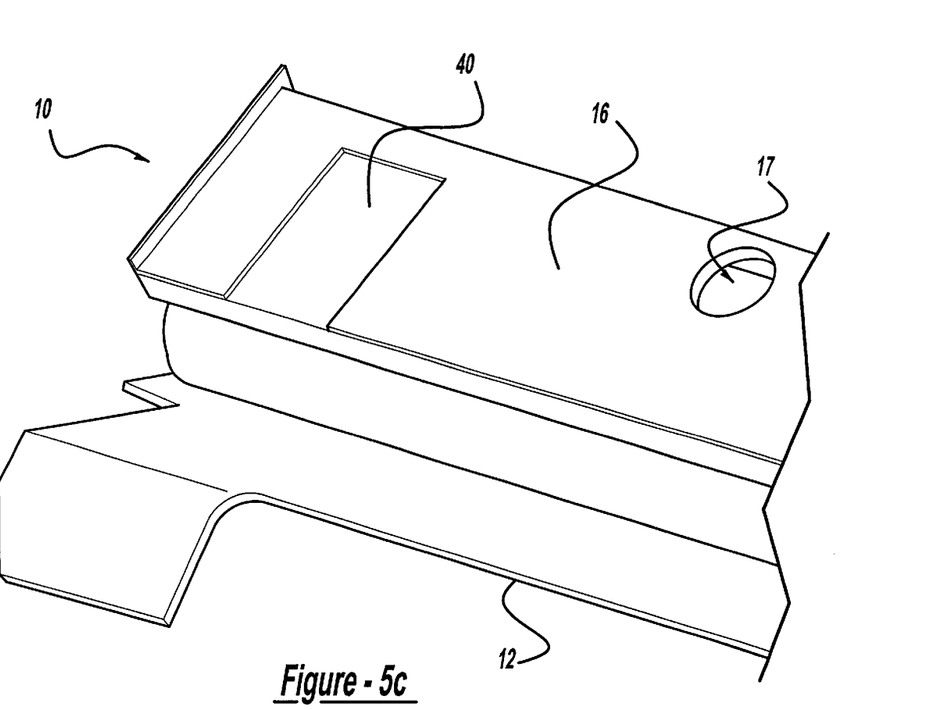
FIG. 5c is a perspective view of the bracket according to the principles of the present invention.
Figure 7:
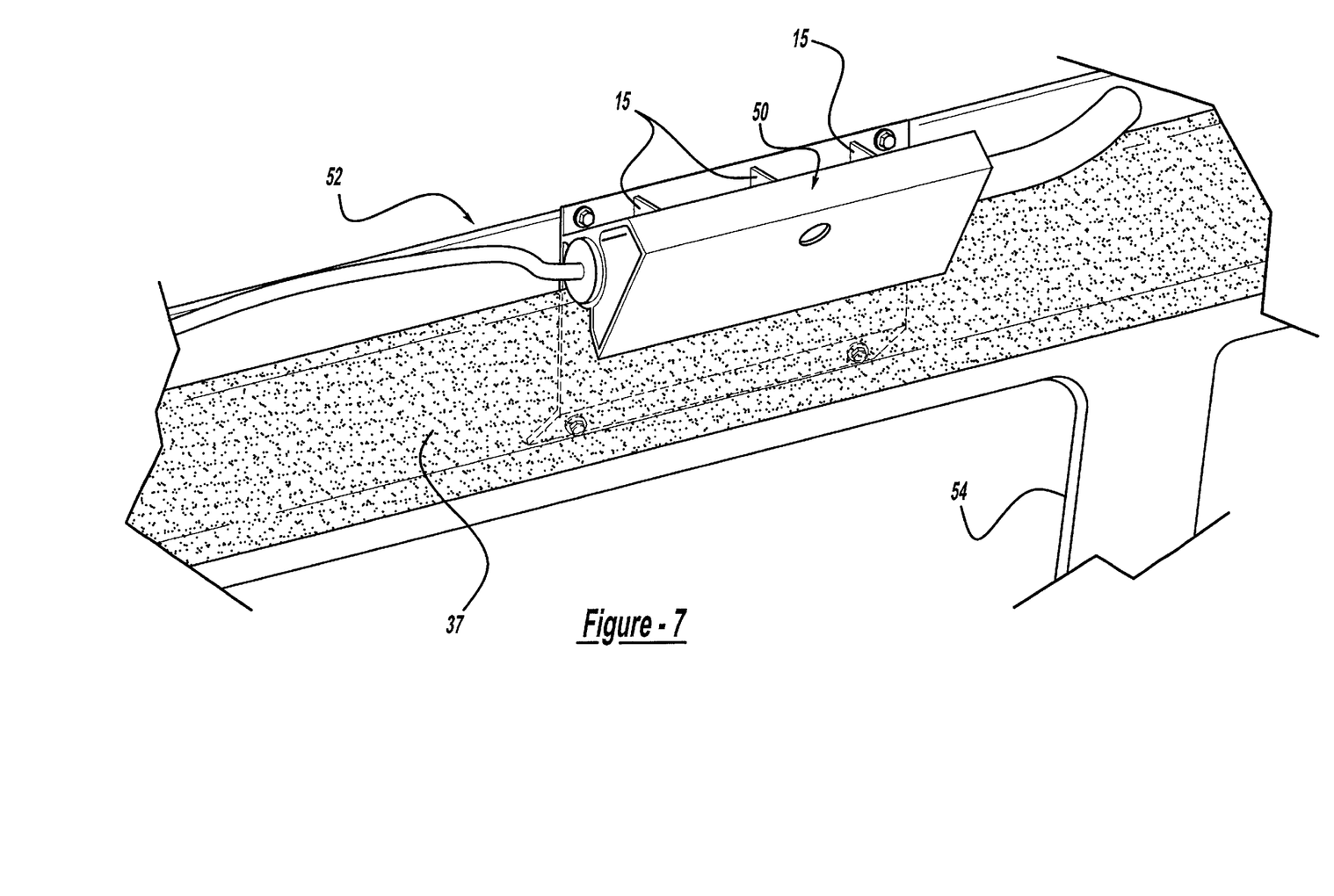
FIG. 7 is a perspective view of an installed airbag unit subassembly according to the principles of the present invention.

With the airbag igniter unit 28 properly installed into bracket 10, the airbag itself may be tucked into the formed recess 22 of the bracket 10 and temporarily secured thereto via clamping means. As such, an airbag unit subassembly 50 is formed comprising a bracket 10, the airbag igniter unit 28, the hose 34, and the airbag 37, as best shown in FIG. 7. The grab handle unit 45 may now be attached to the second face 16 of the bracket 10. As shown in FIGS. 5a–5c, the grab handle unit 45 comprises a grab handle base 46 and a grab handle 48. Additionally, if desired, an interior light 51 may be included in the grab handle unit 45. A pair of step down recessed regions 40 are formed into the second face 16 of the bracket 10 so as to receive mating protruding portions 49 of the grab handle unit 45. The grab handle base 46 also includes a protruding alignment finger 47. A hole 17 is formed through the second face 16 such that alignment finger 47 may be inserted therethrough, facilitating proper alignment of the grab handle unit 45 on the bracket 10. The grab handle unit 45 is then attached thereto by screws. The airbag unit subassembly 50 now includes the interior grab handle unit 45.

Figure 6:
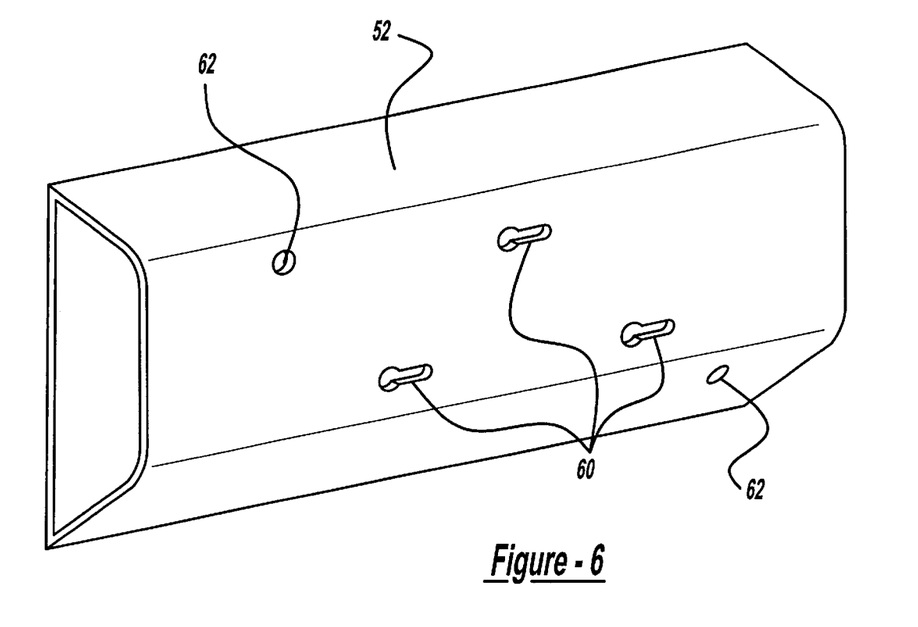
FIG. 6 is a partial perspective view of a frame rail member according to the present invention.

With particular reference to FIGS. 6 and 7, the in-vehicle assembly of airbag unit subassembly 50 will be described in detail. Frame rail member 52 has slots 60 for receiving connection fingers 13. An assembly operator can temporarily attach airbag unit subassembly 50 to frame rail member 52 by inserting connection fingers 13 into slots 60. Once temporarily attached, the assembly operator may retrieve the appropriate tools (not shown) and bolts 42a, 42b (FIG. 2) for permanently attaching airbag unit subassembly 50 to frame rail member 52. This is achieved by bolts 42a, 42b which extend through bracket 10 and engage threaded holes 62 of frame rail member 52. Having performed this simple routine, the assembly operator has installed a complete airbag unit and an interior grab handle. This assembly routine can be compounded to include temporarily connecting first and second airbag subassemblies 50 to both left and right side frame rail members 52 in a single step. In this manner, the installation process of airbag units may further be expedited.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. An assembly bracket for use with an airbag safety restraint system including an airbag and a discharge unit, said assembly bracket comprising:
   a first base portion for attaching said assembly bracket to a vehicle structure;
   a second portion extending from said first base portion and adapted for attaching an interior component thereto;
   a cavity located generally between said first base portion and said second portion and adapted for receiving an airbag system discharge unit therein; and
   a recessed portion located generally between said first base portion and said second portion and adapted for receiving an airbag therein;
   wherein said cavity tapers along a length of said assembly bracket for fixedly retaining said discharge unit therein.

2. The assembly bracket of claim 1, wherein said first base portion includes at least one extending member for temporarily attaching said assembly bracket to said vehicle structure.

3. The assembly bracket of claim 1, wherein said second portion includes a hole for receiving a positioning finger of said interior vehicle component.

4. The assembly bracket of claim 1, wherein said second portion includes at least one recess for receiving a mating piece of said interior component.

5. An assembly bracket for use with an airbag safety restraint system including an airbag and a discharge unit, said assembly bracket comprising:
   a first base portion for attaching said assembly bracket to a vehicle structure;
   a second portion extending from said first base portion and adapted for attaching an interior component thereto;
   a cavity located generally between said first base portion and said second portion and adapted for receiving an airbag system discharge unit therein; and
   a recessed portion located generally between said first base portion and said second portion and adapted for receiving an airbag therein;
   wherein said interior component is a grab handle.

6. The assembly bracket of claim 6, wherein said grab handle includes an interior light.

7. The assembly bracket of claim 6, wherein said first base portion includes at least one extending member for temporarily attaching said assembly bracket to said vehicle structure.

8. The assembly bracket of claim 5, wherein said second portion includes a hole for receiving a positioning finger of said interior vehicle component.

9. The assembly bracket of claim 5, wherein said second portion includes at least one recess for receiving a mating piece of said interior component.

10. A vehicle airbag and interior component subassembly comprising:
    an airbag;
    an airbag igniter unit operatively attached to said airbag;
    a bracket including;
    a first base portion for attaching said assembly bracket to a vehicle structure;
    a second portion extending from said first base portion and adapted for attaching an interior component thereto;
    a cavity located generally between said first base portion and said second base portion for receiving said airbag igniter unit therein;
    a recessed portion located generally between said first base portion and said second portion for receiving said airbag therein; and
    an interior component fixedly attached to a face of said bracket;
    wherein said cavity tapers along a length of said bracket for fixedly retaining said discharge unit therein.

11. The vehicle airbag and interior component subassembly of claim 10, wherein said first base portion includes at least one extending member for temporarily attaching said bracket to said vehicle structure.

12. The vehicle airbag and interior component assembly of claim 10, wherein said second portion includes a hole for receiving a positioning finger of said interior vehicle component.

13. The vehicle airbag and interior component subassembly of claim 10, wherein said second portion includes at least one recess for receiving a mating piece of said interior component.

14. The vehicle airbag and interior component subassembly of claim 10, wherein said first base portion includes at least one extending member for temporarily attaching said assembly bracket to said vehicle structure.

15. The vehicle airbag and interior component subassembly of claim 10, wherein said second portion includes a hole for receiving a positioning finger of said interior vehicle component.

16. The vehicle airbag and interior component subassembly of claim 10, wherein said second portion includes at least one recess for receiving a mating piece of said interior component.

17. A vehicle airbag and interior component subassembly comprising:
- an airbag;
- an airbag igniter unit operatively attached to said airbag;
- a bracket including;
- a first base portion for attaching said assembly bracket to a vehicle structure;
- a second portion extending from said first base portion and adapted for attaching an interior component thereto;
- a cavity located generally between said first base portion and said second base portion for receiving said airbag igniter unit therein;
- a recessed portion located generally between said first base portion and said second portion for receiving said airbag therein; and
- an interior component fixedly attached to a face of said bracket;
- wherein said interior component is a grab handle.

18. The vehicle airbag and interior component subassembly of claim 17, wherein said grab handle includes an interior light.

19. The vehicle airbag and interior component subassembly of claim 17, wherein said first base portion includes at least one extending member for temporarily attaching said assembly bracket to said vehicle structure.

20. The vehicle airbag and interior component subassembly of claim 17, wherein said second portion includes a hole for receiving a positioning finger of said interior vehicle component.

* * * * *

UNITED STATES PATENT AND TRADEMARK OFFICE
CERTIFICATE OF CORRECTION

PATENT NO. : 6,364,343 B1
DATED : April 2, 2002
INVENTOR(S) : Slota et al.

It is certified that error appears in the above-identified patent and that said Letters Patent is hereby corrected as shown below:

Column 6,
Line 11, "of claim 6," should read -- of claim 5, --

Signed and Sealed this

Tenth Day of September, 2002

Attest:

Attesting Officer

JAMES E. ROGAN
Director of the United States Patent and Trademark Office